J. B. MILTON.
THRASHING MACHINE.
APPLICATION FILED MAR. 29, 1920.
1,413,758.
Patented Apr. 25, 1922.
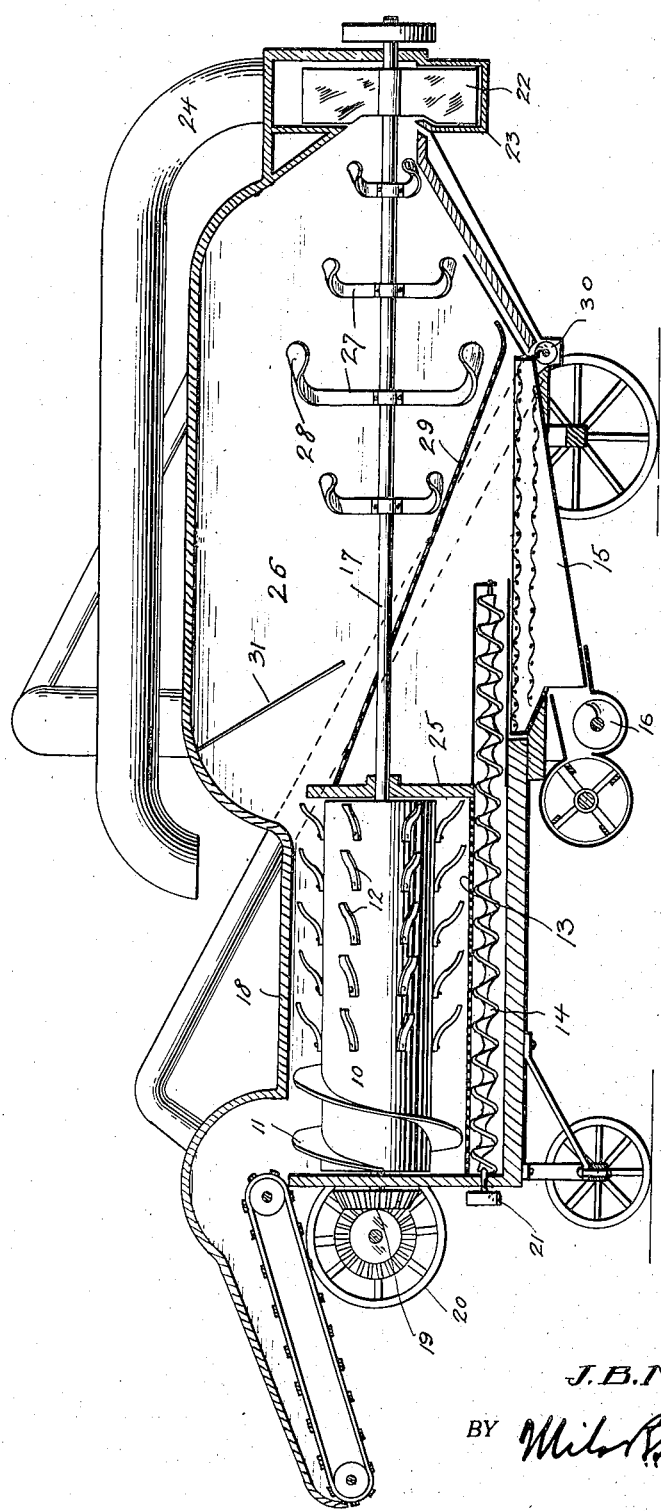
INVENTOR.
J. B. Milton
BY
ATTORNEY.

UNITED STATES PATENT OFFICE.

JOSEPH B. MILTON, OF ENID, OKLAHOMA.

THRASHING MACHINE.

1,413,758.  Specification of Letters Patent.  Patented Apr. 25, 1922.

Application filed March 29, 1920. Serial No. 369,712.

*To all whom it may concern:*

Be it known that I, JOSEPH B. MILTON, a citizen of the United States, residing at Enid, in the county of Garfield and State of Oklahoma, have invented new and useful Improvements in Thrashing Machines, of which the following is a specification.

This invention relates to improvements in thrashing machines, and its object is to provide a novel and improved means for conveying the straw from the thrashing element to the stacker, said means also serving to beat and agitate the straw in such a manner that the grain is separated from the straw and chaff, and the loss of grain is reduced to a minimum.

The object stated is attained by means of a combination and arrangement of parts to be hereinafter described in detail, and in order that the same may be better understood, reference is had to the accompanying drawing forming a part of this specification.

In the drawing a central longitudinal section of the machine is shown.

Referring specifically to the drawing, 10 denotes a thrashing cylinder armed at its receiving end with a spiral conveying screw 11 and to the rear thereof with beater arms 12. The screw forces the material rearwardly to the beater arms. Below the cylinder is located a perforated screen 13, and beneath the latter is a grain auger 14 which carries the grain rearwardly to a grain shoe 15 delivering to the grain auger 16 of the usual grain elevator.

The cylinder 10 is mounted on a shaft 17 extending throughout the entire length of the machine and supported by the end walls of the housing 18 thereof. The housing is mounted on wheels as usual, and the machine is therefore portable.

The front end of the shaft 17 is connected by a bevel gearing 19 to the pulley 20 of a drive shaft. The machine is driven from any suitable power source belted to the pulley 20. On the forward end of the shaft of the auger 14 is a pulley 21 for driving the same. On the rear end of the shaft 17 is mounted a fan 22 for delivering the straw to the usual stacker, the fan being mounted in a casing 23 from which the straw spout 24 leads.

Immediately to the rear of the cylinder 10, the housing 18 contains a transverse partition 25 rising to the height of the cylinder, and spaced at the top from the top of the housing so as to allow the straw to pass from the cylinder into the rear portion 26 of the housing. The shaft 17 passes through this portion of the housing, and is here armed with radially extending beater arms 27 having near their outer ends spiral twists 28 in such a direction that the straw is forced rearwardly to the fan casing 23 as the arms revolve with the shaft.

Above the grain shoe 15 and the discharging end of the auger is a screen 29 which extends with a downward and rearward slant from a point close to the top of the partition to the rear end of the grain shoe, above said end of which latter it terminates. The screen 29 is thus located between the beater arms 27 and the grain shoe 15 and serves to prevent the straw from getting into the latter. However, the grain whipped out of the straw by the beater arm drops through the screen to the shoe. At the rear end of the shoe is the usual auger or screw 30 of the tailings elevator.

Behind the partition 25, and extending downward from the top of the housing 18 is a straw board to deflect the straw downward to the beater arms 27 as it leaves the cylinder and passes over the top of the partition 25 into the straw conveying compartment 26.

In operation, the straw in its passage rearwardly after leaving the cylinder 10 is whipped and beaten out by the arms 27, and also forced rearwardly to the fan casing 23. This beating action on the mass of straw separates the grain present in the mass, and the grain thus beaten out drops through the screen 29 to the shoe 15. The straw is fed rearwardly in a steady stream and no bunching or choking occurs.

I claim:

In a thrashing machine, a housing having thrashing means at one end and a straw conveying compartment to the rear thereof, a transverse partition in the housing back of the thrashing means and spaced from the top of the housing, a grain shoe at the bottom of said compartment, a rotable shaft extending lengthwise through the compartment, radially extending beater arms carried by the shaft and having spiral twists at their extremities to force the straw rearwardly through the compartment, and a screen extending with a downward and rearward slant from the top of the partition to the rear end of the grain shoe, and having its rear end located beneath the beater arms.

In testimony whereof I affix my signature.

JOSEPH B. MILTON.